United States Patent

Mustert

[15] 3,679,314
[45] July 25, 1972

[54] APPARATUS FOR OPTICALLY TESTING THE GENUINENESS OF BANK NOTES AND OTHER TOKENS OF VALUE

[72] Inventor: Rudolf Mustert, Oberwill/Zug, Switzerland
[73] Assignee: Landis & Gyr, Zug, Switzerland
[22] Filed: June 1, 1970
[21] Appl. No.: 41,837

[30] Foreign Application Priority Data

June 12, 1969 Switzerland ........................... 9030/69

[52] U.S. Cl. .................. 356/71, 250/219 DQ, 250/226, 356/186, 356/188
[51] Int. Cl. .................................. G06k 9/08, G01j 3/50
[58] Field of Search .............. 250/219 DQ, 226; 356/71, 178, 356/186, 188-190

[56] References Cited

UNITED STATES PATENTS

| | | |
|---|---|---|
| 3,497,304 | 2/1970 | Berube ................................. 356/178 |
| 3,491,243 | 1/1970 | Tsugami .............................. 356/71 X |
| 3,480,785 | 11/1969 | Aufderheide ....................... 356/71 X |
| 3,496,370 | 2/1970 | Haville et al. ................... 250/219 DQ |

FOREIGN PATENTS OR APPLICATIONS

1,075,205  7/1967  Great Britain ....................... 356/218

*Primary Examiner*—Ronald L. Wibert
*Assistant Examiner*—F. L. Evans
*Attorney*—Morgan, Finnegan, Durham & Pine

[57] ABSTRACT

Apparatus for optically testing the genuineness of bank notes and the like by successively illuminating a selected portion of a note with light beams having different spectral distributions and then detecting the light transmitted through or reflected by the illuminated portion with a light sensitive device such as a photo cell. The output of the photocell is separated into two signals corresponding to the different spectral distributions and the ratio of the two signals is formed. An evaluating circuit is used to decide whether the ratio falls within predetermined limits and, if so, the note is treated as genuine.

3 Claims, 9 Drawing Figures

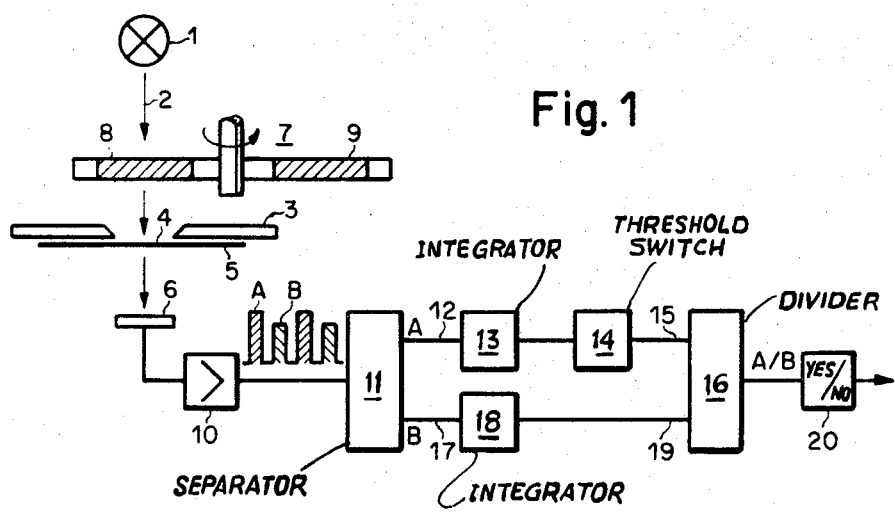
Fig. 1
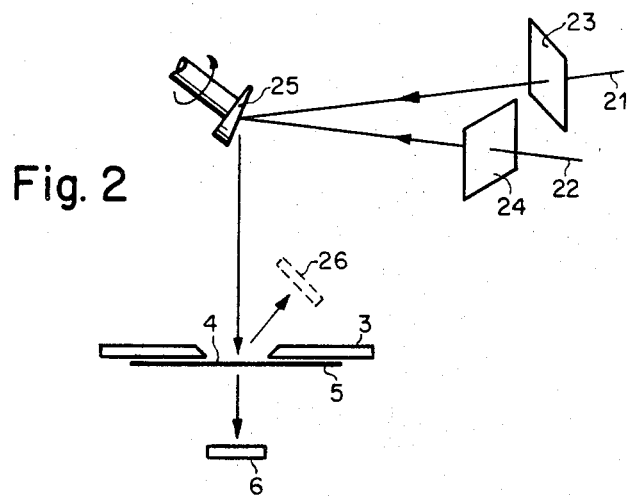
Fig. 2
Fig. 3
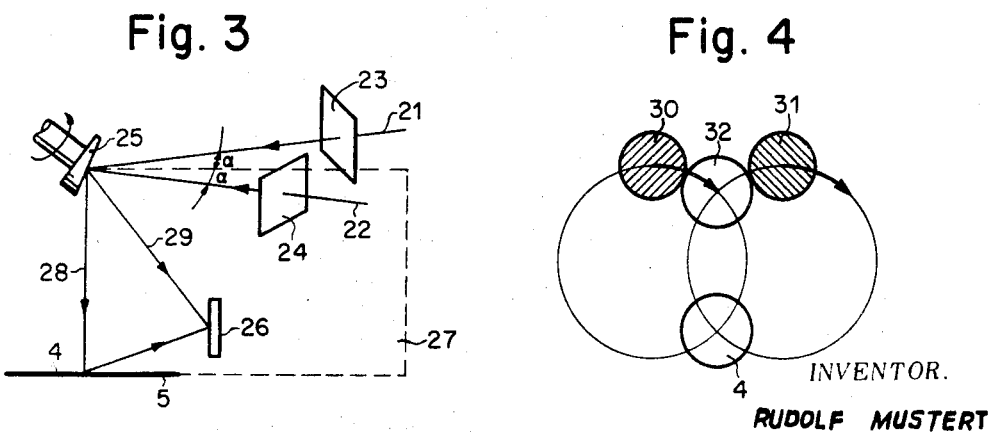
Fig. 4
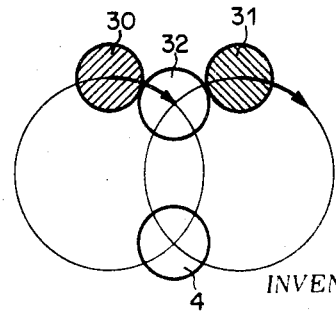
INVENTOR.
RUDOLF MUSTERT PATENTED JUL 25 1972          3,679,314
SHEET 2 OF 3
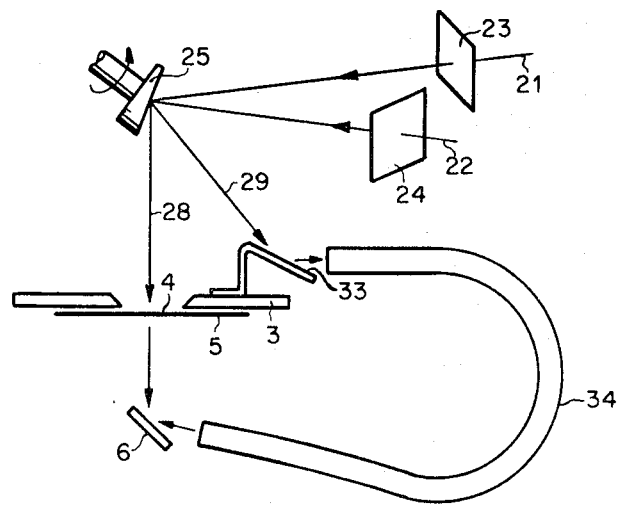
Fig. 5
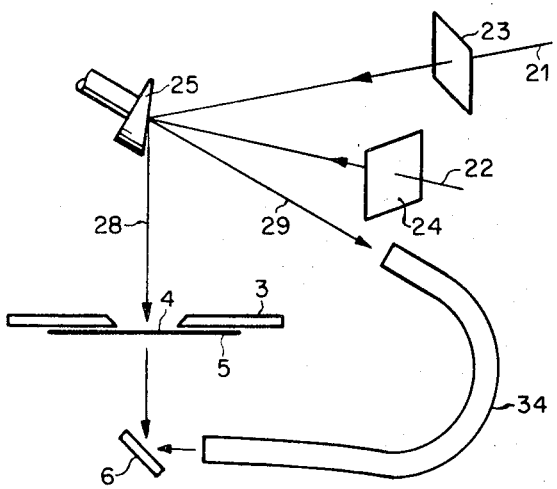
Fig. 6
Fig. 7
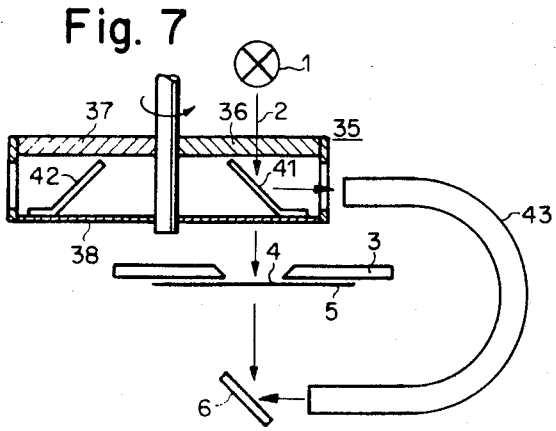
Fig. 8
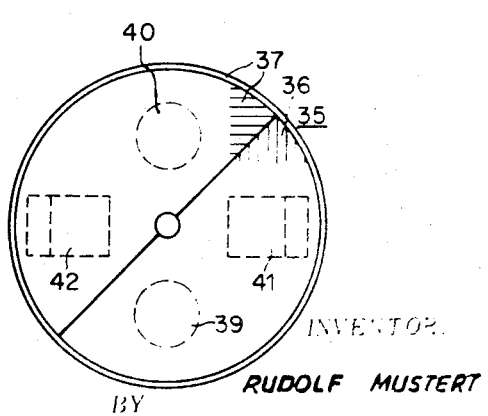
INVENTOR.
RUDOLF MUSTERT
BY Morgan, Finnegan, Durham & Pine
ATTORNEYS

APPARATUS FOR OPTICALLY TESTING THE GENUINENESS OF BANK NOTES AND OTHER TOKENS OF VALUE

BACKGROUND AND BRIEF SUMMARY OF THE INVENTION

The invention relates to an apparatus for optically testing the genuineness of bank notes and other tokens of value, comprising a measuring device for obtaining two distinct measurements at the same point on the object being tested, utilizing light beams with different spectral intensity distributions. An evaluating means is used to compare the two measurements and make a Yes-No decision.

It is known to test the genuineness of bank notes by illuminating selected portions thereof and by measuring the light reflected by or transmitted through the money by means of light probes. In money changing or vending machines the result of the measurement is used to determine whether the money should be accepted or rejected.

Because of the varying degree of soiling of bank notes, the results obtained by measuring the transmitted or reflected light show a wide spread. In the known apparatus, therefore, the tolerance limits employed in reaching the Yes-No decision have to be made correspondingly broad, which in turn reduces the accuracy and utility of the test.

In a known apparatus for testing bank notes an attempt has been made to eliminate the influence of dirt by taking measurements at least at two points on the same piece of money and comparing them. This method is useless if the soiling of the bank note is uneven or purely local. There is also a danger that the light probes used may age to different extents and thus provide false indications.

In another known testing apparatus the light reflected by one point on the bank note is measured by two probes; a green filter is arranged in front of one probe and a red filter in front of the other. The two probes are included in a circuit which gives the difference between the two measurements. Here again, the tolerance limits have to be broad and the presence of any dirt has a direct effect on the result. There is also the danger of the probes ageing to different extents.

According to the invention, the drawbacks of known apparatus can be avoided if the measuring device comprises a single light probe for cyclically ascertaining the two measurements and if the evaluating means comprise a divider to form the quotient of the two measurements.

BRIEF DESCRIPTION OF THE DRAWINGS

Some examples of the invention will be further explained below, with reference to the drawings, in which:

FIG. 1 is a combined pictorial and schematic block diagram of one embodiment of the invention, FIG. 2 is a view in perspective of a second embodiment of the invention;

FIG. 3 is a view in perspective of a third embodiment of the invention;

FIG. 4 illustrates the geometry of the embodiment shown in FIG. 3:

FIG. 5 is a view in perspective of a fourth embodiment of the invention;

FIG. 6 illustrates a modified version of the embodiment of FIG. 5;

FIG. 7 is a view in section of a fifth embodiment of the invention;

FIG. 8 is a top view of a portion of the embodiment of FIG. 7; and

DETAILED DESCRIPTION

Figure 9:
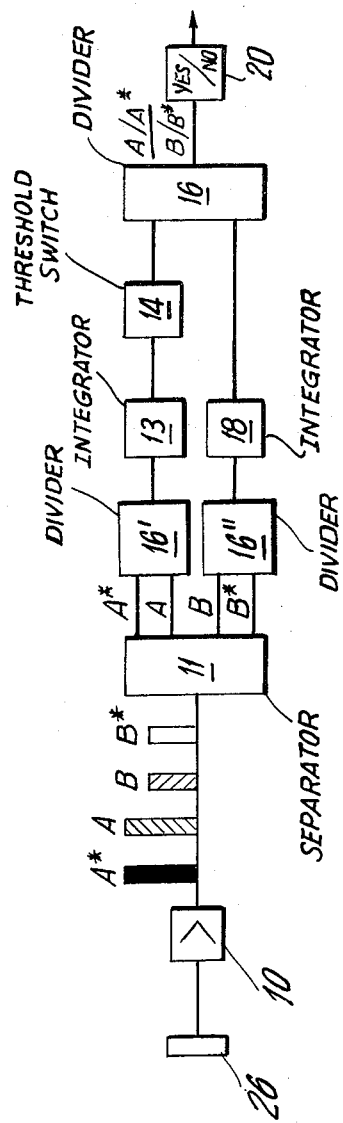
FIG. 9 is a schematic block diagram of an embodiment of the invention disclosed in part in FIG. 3.

Referring now to FIG. 1, a light source 1 emits a light beam 2 which passes through a stop 3 onto a selected portion 4 of a bank note 5. A light probe 6, for example a photoelectric cell, measures the light passing through bank note 5. A rotating disc 7 with two filters 8 and 9 is located in the path of the beam 2. The filters have different spectral transmission properties and light probe 6 responds to each band of transmitted frequencies.

Light probe 6 is connected by an amplifier 10 to a separator circuit 11, which discriminates between the signals produced by probe 6. Output 12 of separator circuit 11 is connected by an integrator 13 and a maximum value checking or threshold switch 14 to an input 15 of voltage divider 16. Output 17 of separator 11 is coupled by an integrator 18 to input 19 of divider 16. Divider 16 is connected to an evaluating circuit 20, for reaching Yes-No decisions.

In operation, light beam 2 passes alternately through filter 8 and filter 9 to the selected portion 4. Light probe 6 converts the light passing through bank note 5 into electrical signals A and B. These are amplified and separated in the separator circuit 11, which may for example, be a two-way switch controlled by the disc 7. The maximum value checking circuit 14 passes on the measurement A only if it does not exceed an upper limit obtained with new, genuine, bank notes. In this way, forgeries where this measurement is particularly large, can be detected.

Divider 16 forms the quotient or ratio A/B of the two measurements. The evaluating circuit 20 makes an acceptance decision if the quotient A/B is within given tolerance limits.

With the apparatus described, any soiling of the bank notes being tested does not affect the result. This is due to the fact that the layer of dirt on old bank notes has substantially non-selective absorption properties, so that when the ratio of the two measurements taken at the same point is formed, the influence of soiling is eliminated.

The table which follows shows the range of the percentage variation for the measurements A and B and for the quotient A/B as ascertained at various measuring points $a$ to $d$, during transmission measurements using a green filter and a violet filter, with a plurality of genuine Swiss 20 Franc bank notes. It will be noted that the measurements A and B depart from the mean by up to $\pm 25$ percent, whereas the quotient A/B departs from the mean by only 4 to 5 percent.

| Measuring point | a | b | c | d |
|---|---|---|---|---|
| Variation range $\pm 21.1$ | | 23.7 | 13.6 | 12.7 |
| Variation range B $\pm 25.9$ | | 24.0 | 15.9 | 16.0 |
| Variation range A/B 4.3 | | 5.3 | 5.2 | 3.8 |

In FIG. 2, in which like references denote the same parts as in FIG. 1, 21 and 22 refer to two light beams, each passing through stationary filters 23 and 24 respectively, onto a rotating mirror 25, the surface of which is inclined to the axis of rotation. The mirror alternately projects beam 21 and beam 22 onto the selected portion 4 of bank note 5. The advantage of this arrangement is that only a small mass need be rotated.

Light beams 21 and 22 are preferably produced by a single light source and projected onto the rotating mirror 25, for example, by mirrors. A dichromatic light splitter may be used instead of filters 21 and 22.

The equipment shown in FIGS. 1 and 2 may, of course, be modified to measure the light reflected from the selected portion 4. In FIG. 2 this is indicated by a light probe 26, shown in dotted lines, which measures reflected light.

By calculating the quotient A/B one can eliminate not only the influence of any soiling of the specimen, but a number of other factors which might make the measurement less accurate, such as non-selective soiling of the paths of the light - provided that it occurs to an equal extent; deviations from the characteristics of the light probe and amplifier and other manifestations of ageing.

The maximum value check which supplements the quotient test, however, is completely exposed to all factors liable to reduce consistency. These factors may be eliminated by obtaining two reference values A* and B* by actually measuring the incident light beam in addition to the two measurements A and B, and by calculating by means of dividers 16' and 16'' the quotient (A/A*)/(B/B*), thus normalizing A and B. In the embodiment illustrated in FIG. 1 the reference value A* and B* may be ascertained before the specimen is inserted and the measurements A and B afterwards. Other advantageous possibilities are illustrated in FIGS. 3 to 8.

An arrangement for measuring the reflected light is shown in FIG. 3. The rotating mirror 25 and light probe 26 are arranged so that the mirror 25 successively projects the light beams 21 and 22 onto the selected portion 4 and directly onto the probe 26. The centers of the mirror 25, selected portion 4 and probe 26 lie in a plane 27 perpendicular to the surface of bank note 5. Light beams 21 and 22 strike mirror 25 parallel with the surface of the note and symmetrically with respect to the plane 27, i.e., at an equal angle $\alpha$. The axial rays of the beams reflected from mirror 25 move over conical surfaces which intersect at surface lines 28 and 29. Probe 26 yields the measurement A or B where the beam 21 or 22 respectively passes through the line 28, and the reference value A* and B* where the bean 21 and 22 respectively passes through the line 29.

The geometrical arrangement may be such that the signals A*, A, B, and B* successively appear at equal intervals of time in a cyclic sequence. This is illustrated diagrammatically in FIG. 4, in which 30 and 31 represent the cross-section of the light beams 21 and 22 and the light-sensitive surface of the probe 26 is shown at 32.

FIG. 9 discloses the particular arrangement of the apparatus of FIG. 1 used to evaluate the signals detected by the probe 26 shown in FIG. 3 and also in FIG. 9. The measurement signals A and B, as well as the reference signals A* and B* are taken from the output of probe 26 and amplified by amplifier 10. The output of the amplifier 10 is connected to a separator 11 and the measurement and reference signals are decommuted by means of said separator. The signals A and A* are then operated on by divider 16' to form the ratio A/A*. Similarly divider 16'' forms the ratio B/B*. Integrator 13 and threshold switch 14 function as described above in connection with FIG. 1. Divider 16 then forms the ratio (A/A*)/(B/B*) which is evaluated by circuit 20 which determines whether or not the ratio is within predetermined limits.

The apparatus shown in FIG. 5 is the same as that shown in FIG. 3 as to components 3 to 4, 21 to 25, 28 and 29. However, probe 6 is located on the side of bank note 5 opposite mirror 25. When light beams 21 and 22 are reflected along surface line 29, they strike reflective surface 33 and are projected by light conductor 34 onto probe 6 where the measurements A* and B* are determined.

Reflective surface 33 becomes superfluous if the inlet of light conductor 34 is arranged coaxially with the surface line 29, as shown in FIG. 6.

In FIG. 7, designation 35 refers to a rotating disc, which is shown in top view in FIG. 8. Two semicircular filters are shown at 36 and 37. A stop 38 contains an aperture 39 associated with the filter 36 and an aperture 40 associated with the filter 37. Reflective surfaces 41 and 42 are arranged between the stop 38 and the filters 36 and 37. Light beam 2 formed by the light source 1 is projected through the filter 36 and 37, the reflective surface 41 or 42 and the light conductor 43 onto the probe 6, to determine the reference value A* and B*. To ascertain the measurement A or B beam 2 passes through the filter 36 or 37, the aperture 39 or 40 and bank note 5 to probe 6.

In order to evaluate the reference value A* and B* and the measurements A and B in the arrangements shown in FIGS. 3, 5, 6 and 7, first the normalized ratios A/A* and B/B* and then the quotient (A/A*)/(B/B*) may be formed by voltage dividers once the signals emitted by the light probe in question have been separated. The maximum value check may, for example, be made on the term A/A*.

I claim:

1. Apparatus for optically testing the authenticity of a specimen comprising:
    1. a source of at least two light beams having different spectral distributions;
    2. optical scanning means responsive to each of said light beams for
        a. transmitting each of said light beams, and
        b. alternately illuminating a selected portion of said specimen with said light beams;
    3. light sensitive detecting means for receiving
        a. said light beams transmitted from said scanning means for producing first and second reference signals in response thereto, and
        b. light beams reflected from said illuminated portion of said specimen for producing first and second measurement signals in response thereto;
    4. means operably connected to said light sensitive detecting means and responsive thereto for producing first and second normalized measurement signals by forming the ratios respectively of said first reference and measurement signals and of said second reference and measurement signals;
    5. divider means operably connected to said means for producing said first and second normalized measurement signals and responsive thereto for forming the ratio of said normalized measurement signals; and
    6. evaluating means operably connected to said divider means and responsive thereto for determining if said ratio of said normalized signals is within predetermined limits.

2. Apparatus for optically testing the authenticity of a specimen comprising:
    1. a source of at least two light beams having different spectral distributions;
    2. optical scanning means responsive to each of said light beams for
        a. transmitting each of said light beams, and
        b. alternately illuminating a selected portion of said specimen with said light beams;
    3. light sensitive detecting means for receiving
        a. said light beams transmitted from said scanning means for producing first and second reference signals in response thereto, and
        b. light beams reflected from said illuminated portion of said specimen for producing first and second measurement signals in response thereto;
    4. separation means operably connected to said light sensitive detecting means and responsive thereto for discriminating among said signals produced by said detecting means to separate said signals according to whether generated in response to light transmitted by said scanning means or light reflected from said illuminated portion of said specimen, and according to the spectral distribution of said light to form first and second reference signals and first and second measurement signals;
    5. means operably connected to said separation means and responsive thereto for producing first and second normalized measurement signals by forming the ratios respectively of said first reference and measurement signals and of said second reference and measurement signals;
    6. divider means operably connected to said means for producing said first and second normalized measurement signals and responsive thereto for forming the ratio of said normalized measurement signals; and
    7. Evaluating means operably connected to said divider means and responsive thereto for determining if said ratio of said normalized signals is within predetermined limits.

3. Apparatus for optically determining the authenticity of a specimen comprising:
    1. a single source of light;
    2. means responsive to said light source for producing at least two different light beams having different spectral distributions;
    3. optical scanning means responsive to each of said light beams for
        a. transmitting each of said light beams, and
        b. alternately illuminating a selected portion of said specimen with said light beams;
    4. a single light sensitive detecting means for receiving a. said light beams transmitted from said scanning means for producing first and second reference signals in response thereto, and
b. light beams reflected from said illuminated portion of said specimen for producing first and second measurement signals in response thereto;

5. means operably connected to said light sensitive detecting means and responsive thereto for producing first and second normalized measurement signals by forming the ratio respectively of said first reference and measurement signals and of said second reference and measurement signals;

6. limit sensing means operably connected to said means for producing said first and second normalized measurement signals and responsive to at least one of said normalized measurement signals for determining if said one signal has exceeded a predetermined value;

7. divider means operably connected to said means for producing said first and second normalized measurement signals and to said limit sensing means and responsive thereto for forming the ratio of said normalized output measurement signals; and 8. evaluating means operably connected to said divider means and responsive thereto for determining if said ratio of said normalized signals is within predetermined limits.

* * * * *